United States Patent [19]

Kinoshita et al.

[11] Patent Number: 4,704,373
[45] Date of Patent: Nov. 3, 1987

[54] DIELECTRIC CERAMIC COMPOSITION AND PROCESS FOR PRODUCING THE SAME

[75] Inventors: Takeo Kinoshita; Hideyuki Ikoma; Tsutomu Tsunooka, all of Aichi, Japan

[73] Assignee: NGK Spark Plug Co., Ltd., Japan

[21] Appl. No.: 924,524

[22] Filed: Oct. 29, 1986

[30] Foreign Application Priority Data

Oct. 29, 1985 [JP] Japan .................. 60-242224
Oct. 29, 1985 [JP] Japan .................. 60-242225

[51] Int. Cl.$^4$ .................................. C04B 35/49
[52] U.S. Cl. .................... 501/136; 501/134; 501/135
[58] Field of Search ............... 501/134, 135, 136

[56] References Cited

U.S. PATENT DOCUMENTS 4,450,240  5/1984  Miyamoto et al. ........... 501/136

FOREIGN PATENT DOCUMENTS 0018155  1/1984  Japan ...................... 501/135
0196503  11/1984  Japan ...................... 501/134
0033257  2/1985  Japan ...................... 501/134
0049501  3/1985  Japan ...................... 501/136

Primary Examiner—William R. Dixon, Jr.
Assistant Examiner—Andrew Griffis
Attorney, Agent, or Firm—Sughrue, Mion, Zinn, Macpeak, and Seas

[57] ABSTRACT

A dielectric ceramic composition is disclosed, comprising as three components lead nickel niobate, lead titanate, and lead magnesium iron tungstate, wherein the composition in terms of the three components is represented by the formula

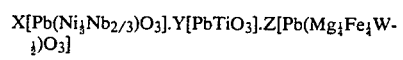

$$X[Pb(Ni_{\frac{1}{3}}Nb_{2/3})O_3] \cdot Y[PbTiO_3] \cdot Z[Pb(Mg_{\frac{1}{4}}Fe_{\frac{1}{4}}W_{\frac{1}{2}})O_3]$$

wherein X+Y+Z=1.00, X, Y, and Z are within the polyhedral area formed by lines connecting points a (X=0.78, Y=0.20, Z=0.02), b (X=0.50, Y=0.20, Z=0.30), c (X=0.40, Y=0.30, Z=0.30), d (X=0.50, Y=0.40, Z=0.10), and e (X=0.58, Y=0.40, Z=0.02) of an X-Y-Z ternary phase diagram. The composition can be sintered at a relatively low temperature, has a high dielectric constant, and is useful as a material for condensers and electrostriction elements.

2 Claims, 2 Drawing Figures

DIELECTRIC CERAMIC COMPOSITION AND PROCESS FOR PRODUCING THE SAME

FIELD OF THE INVENTION

This invention relates to a dielectric ceramic composition having a high dielectric constant which can be sintered at a relatively low sintering temperature and is useful as a material for condensers, electrostriction elements, etc.

BACKGROUND OF THE INVENTION

Laminated ceramic condensers are known to be condensers which can meet the demands for miniaturization of electronic parts, for high frequency applications, and for higher reliability of electronic parts.

Conventional laminated ceramic condensers are produced by printing a noble metal paste having high temperature stability, e.g., Pt, Pd-Pt, etc., on a thin sheet of a highly dielectric ceramic composition, e.g., barium titanate, etc., to form an electrode, laminating a plurality of the sheets, sintering the laminate, and then providing an outer electrode in such a manner that each electrode of the ceramic layers (condenser elements) may be connected in parallel.

In order to cope with the trend of miniaturization of electronic parts, it is desired to decrease the number of condenser elements to be laminated to as low as a number practically possible. To achieve this, the ceramic composition to be used should have a dielectric constant as high as possible, to thereby provide condenser elements having high capacity.

Further, when a laminated ceramic condenser is manufactured using a conventional ceramic composition, sintering should be conducted at high temperatures above 1300° C. Accordingly, a noble metal paste having excellent stability to high temperatures is required as an electrode material, thus making the product expensive. If sintering could be effected at a low temperature, the electrodes could be formed by using inexpensive electroconductive materials, such as Ni, Co, Fe, etc. It has been strongly desired, therefore, to develop condenser materials that can be sintered at low temperatures below 1100° C.

In the production of electrostriction elements, also, the materials therefor have been increasingly required to have high dielectric constants in order to enhance electrostriction, and to have a capability of being sintered at low temperatures from the same standpoint as in the case of condenser elements.

The benefits of dielectric ceramic compositions having high dielectric constants and low sintering temperatures are not only desirable with respect to the above-described laminated condensers and electrostriction elements, but are also desirable in other fields for analogous reasons.

SUMMARY OF THE INVENTION

One object of this invention is to provide a dielectric ceramic composition which has a high dielectric constant and can be sintered at a low temperature.

In accordance with one embodiment of this invention, a dielectric ceramic composition is provided, comprising as three components lead nickel niobate [Pb(Ni$_{1/3}$Nb$_{2/3}$)O$_3$], lead titanate (PbTiO$_3$), and lead magnesium iron tungstate [Pb(Mg$_{1/4}$Fe$_{1/4}$W$_{1/2}$)O$_3$] wherein when the composition is represented by the formula $$X[Pb(Ni_{1/3}Nb_{2/3})O_3]\cdot Y[PbTiO_3]\cdot Z[Pb(Mg_{1/4}Fe_{1/4}W_{1/2})O_3]$$

wherein $X+Y+Z=1.00$, X, Y, and Z are within the polyhedral area formed by lines connecting points a ($X=0.78$, $Y=0.20$, $Z=0.02$), b ($X=0.50$, $Y=0.20$, $Z=0.30$), c ($X=0.40$, $Y=0.30$, $Z=0.30$), d ($X=0.50$, $Y=0.40$, $Z=0.10$), and e ($X=0.58$, $Y=0.40$, $Z=0.02$) of a ternary phase diagram of X-Y-Z.

Another embodiment of this invention comprises a dielectric ceramic composition as in the first embodiment, wherein said composition further contains manganese dioxide in an amount up to 0 1%, preferably 0.02 to 0.04%, by weight based on the total weight of three components.

Still another embodiment of this invention is directed to a process for producing a dielectric ceramic composition, which comprises calcining the components for forming the dielectric ceramic composition as in the first or second embodiment in an oxygen atmosphere.

BRIEF DESCRIPTION OF THE ACCOMPANYING DRAWING

FIGS. 1 AND 2 each shows a ternary phase diagram of the dielectric ceramic composition according to the present invention. In FIG. 2, the area outside the scope of this invention is divided according to the unsatisfied conditions.

DETAILED DESCRIPTION OF THE INVENTION

According to the first embodiment of the present invention, the dielectric ceramic composition is to satisfy the conditions of requiring less than 1100° C. in sintering temperature, and achieving not less than 2000 in dielectric constant, not more than 5% in dielectric loss tan $\delta$ and not less than $1\times 10^7$ $\Omega$.m of specific resistance $\rho$. To satisfy these conditions, X for Pb(Ni$_{1/3}$Nb$_{2/3}$)O$_3$, Y for PbTiO$_3$, and Z for Pb(Mg$_{1/4}$Fe$_{1/4}$W$_{1/2}$)O$_3$ are limited to ranges of from 0.40 to 0.78, from 0.20 to 0.40, and from 0.02 to 0.30, respectively.

In order to confirm the appropriateness of the above limitations for X, Y, and Z, various dielectric samples having varying compositions were prepared at varying sintering temperatures, as indicated in Table 1, according to the following procedure.

Figure 1:
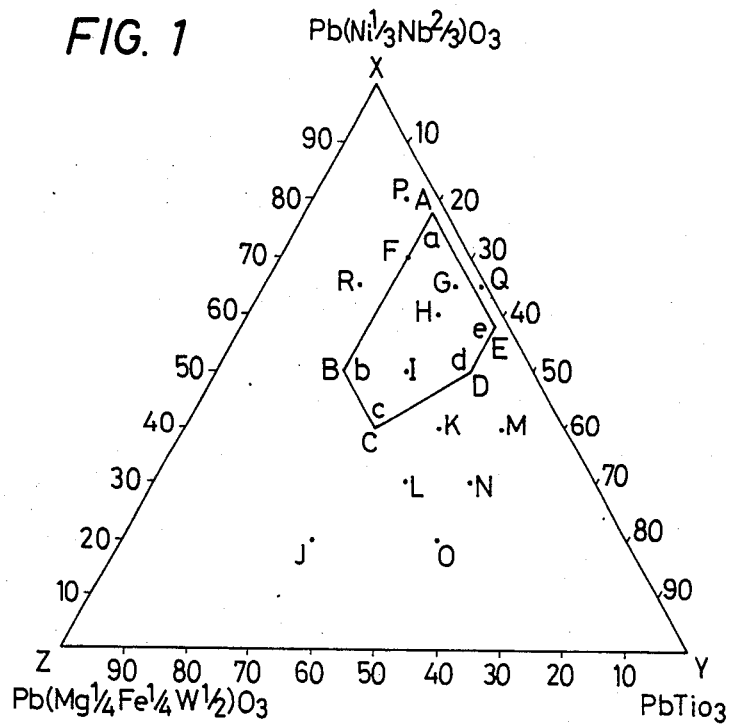

High-purity PbO, NiCO$_3$, Nb$_2$O$_5$, TiO$_2$, MgO, Fe$_2$O$_3$, and WO$_3$ were weighed so as to have compositions A to O as shown in Table 1 and FIG. 1. Each of the resulting mixtures was milled and dry-mixed in an alumina-made pot mill and then subjected to calcination in air at a temperature of from 800 to 830° C. for 2 hours. Adequate amounts of an organic binder and water were added to the calcined product, and the mixture was subjected to secondary milling and mixing for 16 hours, followed by granulation by spray drying. The granulated powder was pressed into a disk of 30 mm in diameter and 1 mm in thickness under a pressure of 1000 Kg/cm$^2$. The molded article was calcined in air at a temperature of from 950 to 1200° C. for 2 hours. Finally, a silver electrode was baked on both sides of the disk at 720° C. to prepare a dielectric sample. The resulting samples were designated as Samples A to O, respectively.

The dielectric constant ε and dielectric loss tan δ on the surface side of each sample were measured under conditions of 1 KHz, 1 V r.m.s., and 25° C., and the specific resistance ρ of each sample was determined from the insulation resistance upon application of direct current of 500 V for 1 minute and the thickness dimension of the sample after the calcination. The result obtained are shown in Table 1 below.

unsatisfied. For example, the area "T,ε" indicates that the calcination temperature and dielectric constant do not fulfill the above-described conditions.

EXAMPLE 2

In the second embodiment of the present invention, addition of an amount of manganese dioxide to the basic composition of Sample G in Table 1 according to the

TABLE 1

| Sample No. | Composition (X:Y:Z) | Calcination Temperature (°C.) | Dielectric Constant ε | Dielectric Loss tan δ (%) | Specific Resistance ρ (Ωm) | Remarks |
|---|---|---|---|---|---|---|
| A | 0.78:0.20:0.02 | 1100 | 7680 | 1.8 | 5.02 × 10$^9$ | Present Invention |
| B | 0.50:0.20:0.30 | 1060 | 3530 | 1.8 | 2.11 × 10$^8$ | " |
| C | 0.40:0.30:0.30 | 1035 | 14060 | 2.7 | 1.50 × 10$^8$ | " |
| D | 0.50:0.40:0.10 | 1060 | 3500 | 2.3 | 3.25 × 10$^9$ | " |
| E | 0.58:0.40:0.02 | 1100 | 5650 | 4.3 | 6.96 × 10$^9$ | " |
| F | 0.70:0.20:0.10 | 1060 | 6430 | 0.3 | 3.74 × 20$^9$ | " |
| G | 0.65:0.30:0.05 | 1095 | 24450 | 3.2 | 9.30 × 10$^9$ | " |
| H | 0.60:0.30:0.10 | 1060 | 18880 | 1.7 | 2.09 × 10$^9$ | " |
| I | 0.50:0.30:0.20 | 1060 | 17040 | 5.0 | 2.38 × 10$^8$ | " |
| J | 0.20:0.30:0.50 | 1000 | 7330 | 11.7 | 3.22 × 10$^6$ | Comparison |
| K | 0.40:0.40:0.20 | 1035 | 4980 | 22.0 | 1.46 × 10$^7$ | " |
| L | 0.30:0.40:0.30 | 1000 | 4210 | 11.2 | 8.83 × 10$^7$ | " |
| M | 0.40:0.50:0.10 | 1060 | 1510 | 1.8 | 2.10 × 10$^9$ | " |
| N | 0.30:0.50:0.20 | 1035 | 1360 | 5.6 | 2.38 × 10$^7$ | " |
| O | 0.20:0.50:0.30 | 1035 | 1430 | 26.2 | 3.13 × 10$^7$ | " |
| P | 0.80:0.15:0.05 | 1150 | 4890 | 0.6 | 7.92 × 10$^9$ | " |
| Q | 0.65:0.34:0.01 | 1180 | 10220 | 3.3 | 1.74 × 10$^9$ | " |
| R | 0.65:0.15:0.20 | 1140 | 2370 | 0.9 | 3.29 × 10$^8$ | " |

It can be seen from the results of Table 1 that the dielectric ceramic compositic'ns within the polyhedral area shown in the phase diagram of FIG. 1 (Samples A to I) have very desirable dielectric constants and small dielectric loses, and also that these characteristics can be attained through sintering at low temperatures.

If X is less than 0.40, the dielectric constant ε becomes small as in Sample O or the dielectric loss tan δ is deteriorated as in Sample J. If it exceeds 0.78, a higher temperature is required for calcination as in Sample P. Thus, the above-described conditions cannot be fulfilled when X is out of the range of from 0.40 to 0.78.

first embodiment brings about an improvement in dielectric loss. In order to demonstrate the effect of the manganese dioxide addition, various dielectric samples were prepared using high-purity PbO, NiCO$_3$, Nb$_2$O$_5$, TiO$_2$, MgO, Fe$_2$O$_3$, WO$_3$, and MnO$_2$. The same procedure as for Samples A to O was followed, except that the composition was shown in Table 2, the calcination temperature was fixed at 1080° C. and the manganese dioxide was added in the amount indicated in Table 2. Evaluation of the resulting samples was made in the same manner as for samples A to O. The results obtained are shown in Table 2 below.

TABLE 2

| Sample No. | Composition (X:Y:Z) | Amount of Mn$_2$ (wt %) | Calcination Temperature (°C.) | Dielectric Constant ε | Dielectric Loss tan δ (%) | Specific Resistance ρ (Ωm) |
|---|---|---|---|---|---|---|
| 1 | 0.67:0.28:0.05 | — | 1080 | 21268 | 1.4 | 2.61 × 10$^8$ |
| 2 | 0.66:0.28:0.06 | — | " | 22275 | 1.2 | 2.2510$^8$ |
| 3 | 0.67:0.29:0.04 | — | " | 23443 | 2.2 | 4.87 × 10$^8$ |
| 4 | 0.66:0.20:0.05 | — | " | 21656 | 1.7 | 6.97 × 10$^9$ |
| 5 | 0.65:0.29:0.06 | — | " | 20069 | 1.7 | 8.50 × 10$^8$ |
| 6 | 0.65:0.30:0.05 | — | " | 22708 | 3.3 | 9.87 × 10$^8$ |
| 7 | 0.67:0.28:0.05 | 0.03 | " | 17365 | 1.1 | 3.12 × 10$^8$ |
| 8 | 0.66:0.28:0.06 | " | " | 16285 | 1.2 | 1.72 × 10$^8$ |
| 9 | 0.67:0.29:0.04 | " | " | 19105 | 1.3 | 4.03 × 10$^9$ |
| 10 | 0.66:0.29:0.05 | " | " | 18199 | 1.4 | 3.53 × 10$^8$ |
| 11 | 0.65:0.29:0.06 | " | " | 17755 | 0.8 | 7.50 × 10$^8$ |
| 12 | 0.65:0.30:0.05 | " | " | 18640 | 1.4 | 4.43 × 10$^8$ |
| 13 | 0.66:0.29:0.05 | 0.02 | " | 19360 | 1.1 | 5.33 × 10$^9$ |
| 14 | 0.65:0.29:0.06 | 0.04 | " | 16949 | 0.8 | 5.87 × 10$^8$ |

If Y is less than 0.20, the calcination temperature becomes too high as in Samples P and R, and if it exceeds 0.40, the conditions of dielectric constant and dielectric loss are not satisfied.

If Z is less than 0.02, the temperature required for calcination is higher than 1100° C. as in Sample Q. If Z exceeds 0.30, the dielectric loss is increased as in Sample J.

Figure 2:
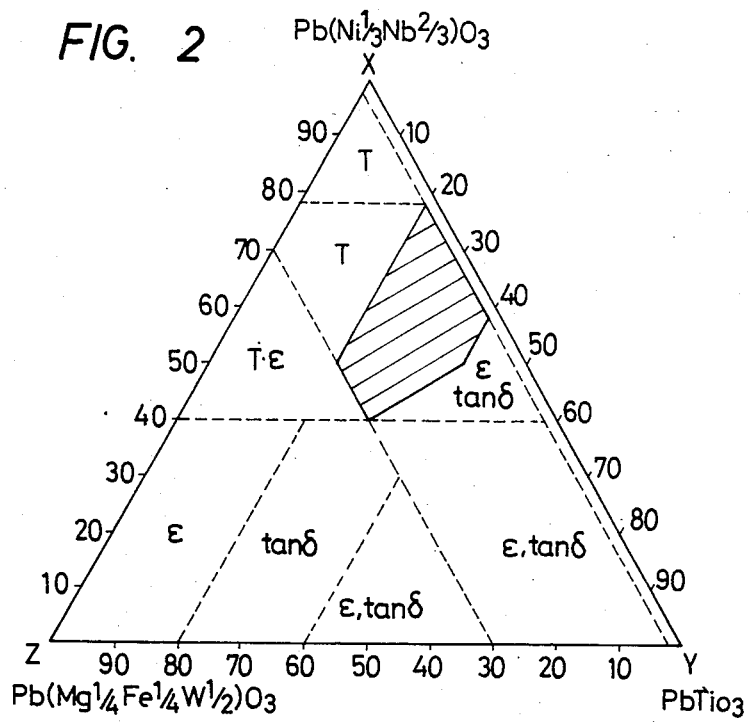

The above results are shown in FIG. 2, in which the area outside the scope of the present invention is divided into some areas each indicating the conditions As can be seen from Table 2 the Sample Nos. 7 to 12 adding manganese dioxide to the composition markedly reduce the dielectric loss without the necessity of increasing the sintering temperature. The dielectric constant is somewhat decreased as compared with the cases of adding no manganese dioxide, Sample Nos. 1 to 6 but is still higher than 16000. However, since addition of an excessive amount of manganese dioxide adversely affects the dielectric constant, the amount of manganese dioxide to be added is up to 0.1%, preferably 0.02 to 0.04% by weight based on the three components.

EXAMPLE 3

In accordance with the third embodiment of the present invention, the dielectric ceramic compositions are calcined in a 100% oxygen atmosphere to further ensure the excellent characteristics of the compositions. In order to demonstrate this effect, Samples A' and D' to G' were prepared in the same manner as for Samples A and D to G, respectively, except for conducting the calcination in a 100% oxygen atmosphere in place of an air atmosphere, and the characteristics of the calcined products were determined in the same manner as described above. The results obtained are shown in Table 3.

TABLE 3

| Sample No. | Composition (X:Y:Z) | Calcination Temperature (°C.) | Dielectric Constance $\epsilon$ | Dielectric Loss tan $\beta$ (%) | Specific Resistance $\rho$ ($\mu$m) |
|---|---|---|---|---|---|
| A' | 0.78:0.20:0.02 | 1090 | 9540 | 1.2 | $2.05 \times 10^{10}$ |
| D' | 0.50:0.40:0.10 | 1000 | 3810 | 2.3 | $1.31 \times 10^{12}$ |
| E' | 0.58:0.40:0.02 | 1090 | 7140 | 2.4 | $9.04 \times 10^{9}$ |
| F' | 0.70:0.20:0.10 | 1030 | 8460 | 0.2 | $4.31 \times 10^{9}$ |
| G' | 0.65:0.30:0.05 | 1030 | 26210 | 3.1 | $5.70 \times 10^{9}$ |

It is apparent from comparisons between Table 3 and Table 1 that calcination in an oxygen atmosphere lowers the calcination temperature, increases the dielectric constant and reduces the dielectric loss more than in the case of calcining in air with respect to each particular composition.

While the invention has been described in detail and with reference to specific embodiments thereof, it will be apparent to one skilled in the art that various changes and modifications can be made therein without departing from the spirit and scope thereof.

What is claimed is:

1. A dielectric ceramic composition comprising as three components lead nickel niobate, lead titanate, and lead mangesium iron tungstate, wherein the composition in terms of the three components is represented by the formula $$X[Pb(Ni_{1/3}Nb_{2/3})O_3] \cdot Y[PbTiO_3] \cdot Z[Pb(Mg_{1/4}Fe_{1/4}W_{1/2})O_3]$$

wherein $X+Y+Z=1.00$, and X, Y, Z are within the polyhedral area formed by lines connecting points a (X=0.78, Y=0.20, Z=0.02), b (X=0.50, Y=0.20, Z=0.30), c (X=0.40, Y=0.30, Z=0.30), d (X=0.50, Y=0.40, Z=0.10), and e (X=0.58, Y=0.40, Z=0.02) of a ternary phase diagram of X-Y-Y.

2. A dielectric ceramic composition as in claim 1, wherein said composition further contains manganese dioxide in an amount of 0.02 to 0.04% by weight based on a ternary component.

* * * * *